United States Patent
Nakayama

(10) Patent No.: US 6,322,837 B1
(45) Date of Patent: *Nov. 27, 2001

(54) METHOD OF HIGH PRESSURE PROCESSING OF MATERIALS

(75) Inventor: Junya Nakayama, Kawaguchi (JP)

(73) Assignee: Nakayama Engineering Co. Ltd., Kawaguchi (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/975,261

(22) Filed: Nov. 20, 1997

(51) Int. Cl.⁷ .................................................. A23L 3/00
(52) U.S. Cl. ........................................ 426/521; 426/665
(58) Field of Search .................................. 426/665, 524, 426/521; 99/467, 484

(56) References Cited

U.S. PATENT DOCUMENTS 5,690,976 * 11/1997 Nakayama .......................... 426/524

* cited by examiner

Primary Examiner—George C. Yeung
(74) Attorney, Agent, or Firm—Susan M. Ben-Oliel; Barrister & Solicitor

(57) ABSTRACT

A method of pressure processing a material comprises placing the material in a pressure chamber of an enclosed housing, said chamber providing a pressurizing medium and an inflatable resilient pouch, said pouch then being inflated with a pressure agent such that pressure is applied by the surface of the pouch to the pressurizing medium, said medium in turn applying pressure to the material for a sufficient duration and degree to process the material.

7 Claims, 2 Drawing Sheets

METHOD OF HIGH PRESSURE PROCESSING OF MATERIALS

FIELD OF THE INVENTION

The present invention relates to the field of high pressure processing of materials such as food.

BACKGROUND OF THE INVENTION

In recent years, food has been treated with high pressure for the purpose of either processing, pasteurization or preservation. Pressure treatment has shown considerable promise as a new food processing technique because it can avoid problems caused by the use of conventional heat treatments such as the destruction of the nutrients and the distortion of the original shape of the food product. Furthermore, the technique of high pressure processing does not alter the flavour or lessen nutritional value of the food.

The processing of food under high pressure uses a hydrostatic pressure exceeding 1,000 atmospheric pressure units. The pressure processing devices submerge material, such as food, into a pressurizing fluid sealed in a pressure container. Pressure is then applied to pressurizing fluid through, for example, pistons. This is shown, for example, in Japanese Patent Disclosures No. Heiress 3-22964 and Heisei 3-47058 in the Japanese Patent Journal.

Other methods involve a device such as a bag, diaphragm or elastic wall which is placed into a pressurizing medium and sealed in a pressure container and then pressure is applied through a secondary pressurizing medium contained in the device (for example in Japanese Patent Disclosures No. Heisei 2-89598, Heisei 3-10793 and Heisei 3-12794 in the Japanese Patent Journal). These types of containers were designed to increase the amount of pressurization, however, they require a high degree of precision manufacturing as described below.

The pressure containers used in these known pressure processing devices are constructed in such a way that a lid is used to close the opening of the container. Any gap existing between the lid and the body of the container has to be sealed with either a packing material or by some other means. This not only requires the designing of a special sealing mechanism (for example in Japanese Patent Disclosure No. Heisei 2-89877 in the Japanese Patent Journal), but it also requires a high degree of precision manufacturing in connecting the joining portions of the container body and the lid to ensure a tight seal. Without such sealing, the pressurized fluid would seep out of the container during processing. The known sealing mechanisms are often costly to manufacture and incorporate into the structure and have not heretofor proved to be entirely effective.

It is an object of the present invention to obviate or mitigate the above disadvantages.

SUMMARY OF THE INVENTION

The present invention provides a method of pressure processing a material which comprises placing the material in a pressure chamber of an enclosed housing, said chamber providing a pressurizing medium and an inflatable resilient pouch. The resilient pouch is then inflated with a pressure agent such that pressure is applied by the surface of the pouch to the pressurizing medium, said medium in turn applying pressure to the material for a sufficient duration and degree to process the material.

In another aspect of the present invention, an apparatus suitable for processing a material is provided which comprises an enclosable housing having a lid and a body, said body portion providing a pressure chamber suitable for holding a pressurizing medium and a material to be processed. The apparatus additionally comprises an inflatable resilient pouch which is capable, in an inflated state, of exerting sufficient pressure on the pressurizing medium for the medium in turn to pressurize and thereby process the material and of providing a seal between the body and the lid.

The significant advantages of the present invention include the simplicity of design, structure and maintenance of the apparatus, the increased pressurizing capability and the elimination of precision assembly of the "joining" parts such as the lid and the body portions due to the use of the inflatable resilient pouch as a sealant. The apparatus of the present invention can be manufactured in an economical way without sacrificing its effectiveness. Furthermore, the method of the present invention allows material to be treated under high uniform pressure in a simple and economical way.

BRIEF DESCRIPTION OF THE DRAWINGS

The present invention is described by way of illustration in the following non-limiting drawings in which.

PREFERRED EMBODIMENTS OF THE INVENTION

Figure 1:
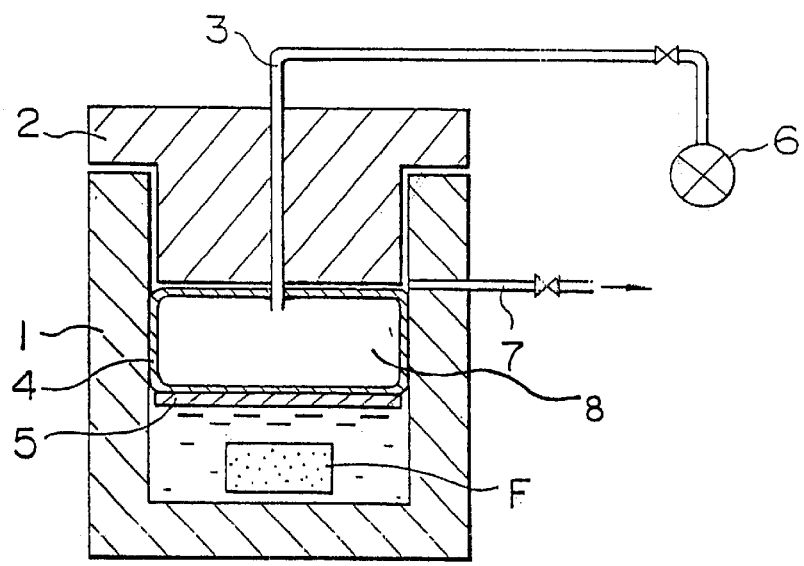
FIG. 1 is a side-view in cross-section of an apparatus in accordance with the present invention.

With reference to the figures and particularly to FIG. 1, wherein like numerals depict the same features as between the drawings, there is provided generally a pressurizable housing (not numbered) comprising a body 1 and a lid 2 which are capable, when the lid is in a closed position, of abutting each other or interconnecting in some way. Disposed through lid 2 is a pressure agent supply line 3 leading from supply pump 6 to a resilient inflatable pouch 4. Supply line 3 is depicted in the figures as vertically traversing either the lid or the body and although these are the preferred configurations, they are by no means the only way in which pouch 4 may be supplied with pressurizing agent.

Figure 2:
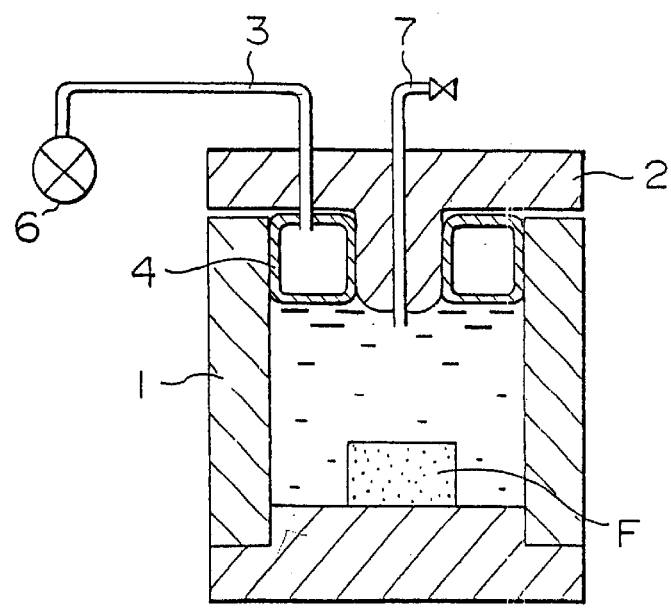
FIG. 2 is a side-view in cross-section of a different embodiment of an apparatus in accordance with the present invention showing two inflatable resilient pouches.

The interior cavity of body 1 defines a pressure chamber which is filled with pressurizing medium 8. Within pressurizing medium 8 is disposed a material F to be processed in accordance with the method of the present invention. An air-escape conduit 7 cuts through a wall of body 1 to permit removal of air from the internal cavity of the body. It is to be understood, however, that this conduit may cut through lid 2 (as shown in FIG. 2) or through any other portion of the housing as long as the purpose of air escape from the interior cavity may be achieved.

Figure 3:
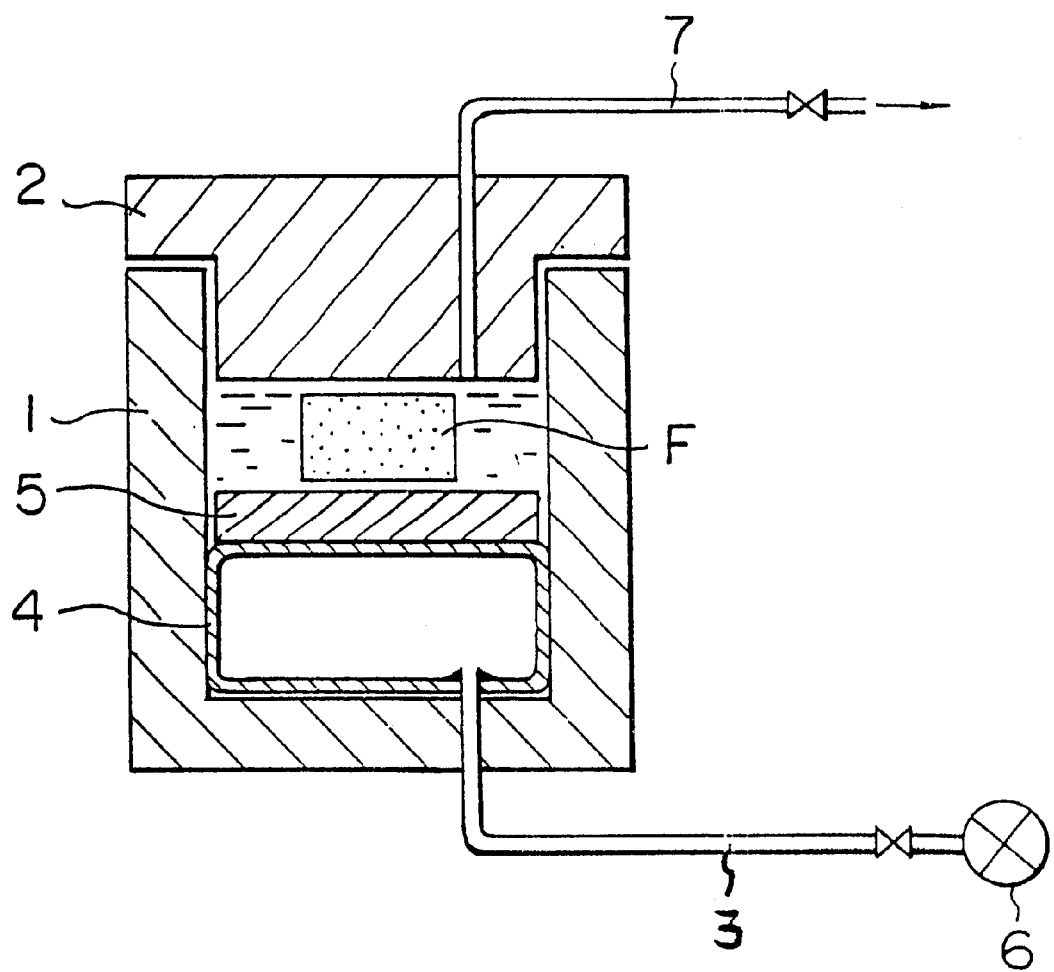
FIG. 3 is a side-view in cross-section of a different embodiment of an apparatus in accordance with the present invention showing an inflatable resilient pouch disposed along the lower portion of the apparatus.

FIG. 1 depicts inflatable pouch 4 in an inflated position abutting lid 2 (which is in a closed position) and sitting within body 1. Pouch 4 need not necessarily abut lid 2 and may be situated below the pressurizing medium as depicted in FIG. 3. In an alternative embodiment, there may be more than one pouch disposed within the body. For example, (not shown) one pouch may be situated between the pressurizing medium and the lid (as in FIG. 1) and yet another pouch situated below the medium as shown in FIG. 3. Generally, however, pouch 4 presents a disc-like form which, when inflated, provides a plane of contact covering the entire surface area of pressurizing medium 8. Alternatively, the pouch may present a doughnut-like form as depicted in FIG. 2 filling, when inflated, the space between the inner wall of body 1 and the outer circumference of lid 2.

The key advantage in having at least one pouch abutting lid 2 is that this pouch acts as a seal when the lid is in the closed or operational position by filling the space between lid 2 and body 1 thereby eliminating the need for known costly and complicated sealing mechanisms. These known mechanisms require a high degree of precision work to be operable and are prone to leakage and failure. The provision of an inflatable pouch as provided herein avoids the need for any other sealing mechanism. In addition, the combination of the inflatable pouch sealing mechanism and the pressurizing medium with the present apparatus enhances the uniform pressurizing capability of the unit.

Inflatable pouch 4 may be of various shapes and configurations for use within the apparatus of the present invention so long as the pouch has a character of resiliency and is capable of inflation and deflation under pressure. In addition, the pouch should be non-porous i.e. possessing the "barrier" qualities necessary to separate the pressurizing agent within the pouch from pressurizing medium 8. In preferred forms, the pouch may be the shape of a bellows or a balloon. Furthermore, the pouch should be of sufficient size and of a suitable shape such that on inflation by force of the pressurizing agent, the pouch exerts pressure on pressurizing medium 8 which in turn pressurizes and processes material F. Under certain conditions, it may also be desirable that the pouch be heat-resistant or alternatively be covered with a heat-resistant coating. This coating is not necessary, however, for all embodiments of the invention.

Preferably, the pouch is made of a synthetic rubber selected from the group comprising chloroprene, nitryl, silicone and fluorine and should be sufficiently weatherproof and mechanically strong to ensure the required expandability and flexibility.

In a preferred form, anti-distortion disc 5 may be fitted onto or be integral with pouch 4 in order to maintain a flat contact surface with pressurizing medium 8. As depicted in FIG. 1, anti-distortion disc 5 is disposed "below" pouch 4 to ensure uniformity in pressure across the surface of pressurizing medium 8. In FIG. 3, disc 5 is disposed "above" pouch 4. Generally, any type of flat barrier between the pouch and the pressurizing medium will serve this purpose. Anti-distortion disc 5 may be formed as a thin disc, as shown in FIG. 1, or a thick circular block, as shown in FIG. 3. It may be attached either to all or part of the pressurizing surface.

In operation, and with reference to all of the figures, body 1 is partially filled with pressurizing medium 8 and material F (such as food) to be processed is submerged into the pressurizing medium, the latter of which holds the material in place during processing. Pouch 4 is then placed between lid 2 and body 1 as the lid is used to "close" the cavity of the body. The pressurizing agent (such as compressed air or water) is then fed using pressure pump 6 via supply line 3 into pouch 4 thereby inflating the pouch to the desired level. In the embodiments shown in FIGS. 1 and 2, the inflated pouch completely seals the space between the interior of body 1 and the rim of lid 2. In addition, as pouch 4 abuts the interior surface of lid 2 it, in conjunction with the repulsion force created against the internal pressure of body 1 when lid 2 is secured in place, demonstrates the characteristic property to expand outwardly in body 1. This expansion causes pouch 4 to make close contact with the inner circumference of body 1, and at the same time to press tightly against the interior wall surfaces of body 1 and lid 2 to fill in the space between them. When deflated, pouch 4 presents a compact shape. For example, it may be folded down in an accordion-like manner, or simply contracted when deflated.

Pouch 4 may be expanded in advance to achieve a desired internal pressure, or, preferably, may fitted with an external pressure supply system (such as that shown using pressure pump 6 and supply line 3) so that only the internal pressure of body 1 but also the internal pressure of pouch 4 can be continually adjusted when the pouch is in place within the body.

FIG. 1 shows an example of the configuration of pouch 4 which appears in almost a disc-like form on the contact surface against the entire surface area of the underside of lid 2 fitted in body 1. FIG. 2 shows an example of the configuration of pouch 4 that wraps around a protrusion attached near the centre of the underside of lid 2 wherein the pouch is fitted into opening of body 1 so as to ensure a tight contact against the underside of lid 2 and the interior surface of the body 1. This latter configuration appears in an almost doughnut-like form on top plan view (not shown).

Pouch 4 may be attached on top of the inside bottom wall of body 1, as illustrated in FIG. 3, allowing for the pressurization from the bottom of the body 1 using a pressurizing agent supplied through supply line 3 that passes through the bottom wall of the body 1. In this instance, the space between body 1 and lid 2 is sealed by a sealing mechanism, the drawing of which is omitted, or by another hollow and elastic pouch, as shown in FIGS. 1 and 2. As discussed above, in these latter two figures, pouch 4 expands between lid 2 and pressurizing medium 8 and seals the gap existing between the exterior and the circumference of lid 2 to hermetically seal body 1 and to enhance the effect of the pressurizing function of pressurizing medium on the material.

Once the lid is closed and pouch 4 inflated, the exterior surface of the pouch abuts both the interior wall surface of body 1 and the contact surface of pressurizing medium 8 thereby exerting pressure on the pressurizing medium. Pressurizing medium 8, in turn, transfers this pressure to material F submerged therein. This causes material F submerged in the pressurizing medium to be placed under an amount of pressure as desired, enabling the same hydrostatic processing to occur as in conventional methods. This way, the process and apparatus of the present invention allow easier and more economical treatment of food and other materials for the purposes of processing, pasteurization or preservation.

The amount to which pouch 4 is pressurized depends on several factors, including the nature of the material to be processed. Generally, it is well within the purview of a skilled person in this area, having the description of the invention as provided herein and knowing the levels and times required for other hydrostatic processing techniques, to individualize the pressure level and time for each material to be processed. Pressurization using the method and device of this invention enables one to obtain, by appropriate selection of material and thickness of the membrane of the pouch, up to about 10,000 atmospheric units of pressure.

Once processing is complete, the pressure is released from pouch 4 thereby deflating the pouch. Lid 2 is removed and material F retrieved.

Many materials can be processed in accordance with the present invention. Particularly suitable materials are those requiring processing (especially under high pressure), pasteurization or long/short-term preservation, for example, foods.

The pressurizing agent may be any suitable liquid or gaseous media including, but not limited to, water and other liquids such as oils, and gases such as compressed air. In a most preferred form, the pouch is pressurized by hydraulic pressure via a pressurizer (not shown in the figures). In this way, the pressurizing agent is pressurized by a high-pressure pump (shown as 6) and flows through supply line (shown as 3). The high pressure pump also serves to deflate pouch 4 by "draining" the pressurizing agent at the completion of the processing cycle.

In an optional embodiment, the pressurizable housing (comprising body 1 and lid 2) may be located inside a low-temperature brine container to enable processing of the material under high-pressure and at the same time, controlled temperatures.

Pressurizing medium 8 may be any suitable liquid or gaseous media. During the processing of material F, this medium itself may also be processed by the pressure exerted by pouch 4. For example, by using coloured water as the pressurizing medium, one can make coloured ice, or by using carbonated water, one can make carbonated ice. Moreover, because the fluid is directly pressurized, the ice produced is clear and very hard. For more detail concerning pressure treatment of fluids, please refer to U.S. Pat. Application Ser. No. 08/543,642, now U.S. Pat. No. 5,690,976, to Nakayamo Engineering Co. Ltd. which is incorporated herein by reference.

In summary, the process and apparatus of the present invention enables the pressurizing medium itself to be pressure processed, as well as the material submerged within this medium. The system applies pressure to pressurizing medium 8 sealed in the pressurizable housing through the inflation of pouch 4 by the an appropriate pressurizing agent. In addition, pouch 4 itself possesses a sealing capability thus eliminating the need for a sealing mechanism or high-precision assembly of body 1 and lid 2. The configuration is simplified, making for easy maintenance.

In particular, as pouch 4 is inserted between pressurizing medium 8, the walls of body 1 and the lid 2, it acts, when inflated, as a sealing mechanism to seal gaps between the body and the lid. Also, the pouch cuts off the interior from the external environment of the housing, enabling the simplification of the overall configuration.

Furthermore, with attachment of anti-distortion disc 5 to the pressurizing surface of pouch 4, the pressurizing surface of the pouch is rendered free from uneveness during the expansion. Anti-distortion disc 5 flattens out the contact surface against pressurizing medium 8 to ensure even distribution of pressure over the entire surface of the medium.

I claim:

1. A method of pressure processing a material which comprises:

placing the material in a pressure chamber of an enclosed housing, said chamber containing a pressurizing medium and an inflatable resilient pouch;

inflating said resilient pouch with a pressurizing agent such that pressure is applied by the surface of the pouch, which is not in direct contact with the material, to the pressurizing medium, said medium in turn exerting pressure of sufficient strength and for sufficient time to pasteurize or preserve the material within said medium.

2. The method of claim 1 wherein the resilient pouch, when inflated by the pressurizing agent, provides a seal between a lid portion of the housing and a body portion of the housing.

3. The method of claim 1 wherein the material is food.

4. The method of claim 1 wherein the pressurizing agent is selected from the group consisting of a liquid or a gas.

5. The method of claim 1 wherein the pressurizing medium is a liquid.

6. The method of claim 1 wherein the resilient pouch is made of a synthetic rubber selected from the group consisting of chloroprene, nitryl, silicon and fluorine.

7. The method of claim 1 wherein there is additionally provided a flat barrier between the resilient pouch and the pressurizing medium.

* * * * *